United States Patent [19]

Derbyshire

[11] Patent Number: 4,684,139
[45] Date of Patent: Aug. 4, 1987

[54] DRILL CHUCK

[75] Inventor: George C. Derbyshire, Sheffield, England

[73] Assignee: The Jacobs Manufacturing Company, Limited, Sheffield, England

[21] Appl. No.: 824,411

[22] Filed: Jan. 31, 1986

[30] Foreign Application Priority Data

Feb. 12, 1985 [GB] United Kingdom ................. 8503530

[51] Int. Cl.⁴ ........................ B23B 31/12; B23P 11/00
[52] U.S. Cl. ......................................... 279/62; 29/243; 29/438; 29/444
[58] Field of Search ..................... 279/60–65, 279/55–57; 29/243, 509, 522 R, 437, 438, 444

[56] References Cited

U.S. PATENT DOCUMENTS

| 2,561,638 | 7/1951 | Richardson | 29/522 X |
| 3,154,615 | 10/1964 | Cooprider | 29/522 R |
| 3,938,817 | 2/1976 | Röhm | 279/60 X |
| 4,067,587 | 1/1978 | Derbyshire | 279/62 |

Primary Examiner—Gil Weidenfeld
Assistant Examiner—Steven C. Bishop
Attorney, Agent, or Firm—C. L. Johnson, Jr.

[57] ABSTRACT

A drill chuck having a cylindrical sleeve connected to its bevel gear element and a rearward part of the sleeve being rotatable on a cylindrical portion of the chuck body, the chuck body being formed with a number of localized swellings at the surface of the cylindrical portion to retain the sleeve in position, the swellings having been formed by plastic deformation of the metal of the body part.

4 Claims, 5 Drawing Figures

DRILL CHUCK

FIELD OF THE INVENTION

The invention relates to drill chucks and in particular to the manner in which the usual cylindrical or generally cylindrical sleeve portion, in a chuck of the kind concerned, is retained in position on the body part.

In a chuck of the kind concerned, the body part has jaws which are slidably mounted in respective bores, and a nut member is rotatably mounted on the body part but is axially located in a circumferential groove encircling said body part. The nut has screw-threaded engagement with the jaws for advancing said jaws through a forward portion of the body part to grip a drill shank, and for retracting said jaws on reverse rotation. A bevel gear element with which the teeth of an extraneous chuck key may be engaged to tighten or slacken the jaws may be formed as a complete ring and encircle the nut (which must of necessity be formed in halves). Alternatively, the bevel gear element may be formed integrally with the nut, in which case the integral nut and bevel gear element will be formed in halves to enable the threaded portion of the nut to be engaged with the threaded portions of the jaws through the circumferential groove in the body part. The cylindrical or generally cylindrical sleeve referred to above is connected to said bevel gear element, or to the integral nut and bevel gear element, as the case may be, and extends rearwardly of the body part to rotatably engage a cylindrical portion of said body part remote from the nut member. Abutment means are provided at that end of the body part on which the cylindrical or generally cylindrical sleeve is rotatably engaged and act against the latter to hold it in the required position relative to the bevel gear element or integral nut and bevel gear element as the case may be.

SUMMARY OF THE PRIOR ART

Various forms of abutment have previously been employed to act against the cylindrical or generally cylindrical sleeve in order to hold it in its required position relative to the bevel gear element or integral nut and bevel gear element, as the case may be. For example, the cylindrical portion of the body part has been provided with a circumferential groove and a resilient split ring has been provided for snap fitting in said groove. Such means usually work quite well, but the cost of providing such abutment means are relatively high, involving the machining of the groove, the manufacture of the split ring and the fitment of the ring in the groove on assembly of the chuck, and if for any reason the resilient split ring should fail to retain the cylindrical sleeve in its required position to hold together the two halves of an integrally formed nut and bevel gear element, the two halves of the latter could fly out under centrifugal force as the chuck is in use and possibly cause serious injury.

SUMMARY OF THE INVENTION

The object of the invention is to provide abutment means for acting against the cylindrical or generally cylindrical sleeve in a chuck of the kind referred to, such means being of relatively low cost and providing a very safe method of retention.

According to one aspect of the invention, there is provided a chuck including a body part having an axially extending bore for the reception of a drill shank; three equally spaced bores diverging from the axially extending bore for the reception of respective jaws; a nut member rotatably mounted on the body part and located in a circumferential groove in said body part to have screwthreaded engagement with the jaws; a bevel gear element either connected to or formed integrally with said nut member, a cylindrical or generally cylindrical sleeve connected to the bevel gear element or to the integrally formed nut and bevel gear element, as the case may be, and extending rearwardly of the body part to rotatably engage a cylindrical portion of said body part; and abutment means provided at that end of the body part on which the cylindrical or generally cylindrical sleeve is rotatably engaged to hold said sleeve in its required position relative to said bevel gear element or integral nut and bevel gear element, said abutment means being constituted by a plurality of localised swellings formed at the surface of the cylindrical portion of the body part which is engaged by the cylindrical or generally cylindrical sleeve, said localised swellings having been produced by plastic deformation of metal longitudinally of the body part. The localised swellings will preferably be at least three in number and be equally spaced around the cylindrical portion of the body part on which the sleeve is rotatably engaged.

According to another aspect of the invention, there is provided a method of forming abutment means at the rearward end of the body part of a chuck of the kind referred to in order to hold in its required position the cylindrical sleeve connected to the bevel gear element or to the integrally formed nut and bevel gear element, as the case may be, the method including the step of placing the assembled chuck in upstanding condition on a press tool so that the cylindrical portion of the body part on which the abutment means are to be formed registers in a cylindrical depression in the press tool and rests upon a plurality of spaced pins upstanding from the bottom of said depression, and the subsequent step of pressing the assembled chuck inwardly of the depression to cause the plurality of spaced pins to produce respective plastic deformations of metal longitudinally of the cylindrical portion of the body part, these forming respective localised swellings at the surface of said cylindrical portion of the body part. Means will preferably be provided for guiding the assembled chuck downwards into engagement with the cylindrical depression.

DESCRIPTION OF PREFERRED EMBODIMENT

Figure 1:
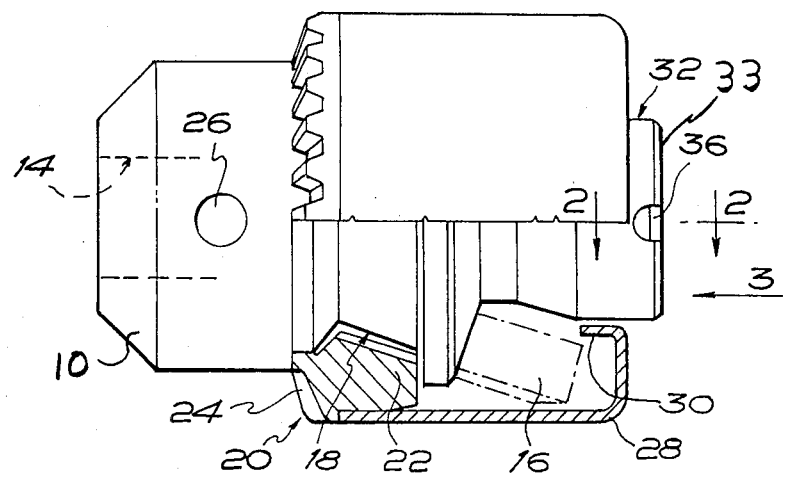
FIG. 1 is a side view, partly in section, of a drill chuck embodying the invention.
Figure 2:
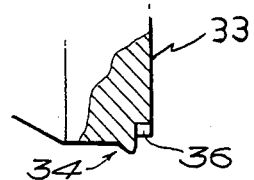
FIG. 2 is a scrap sectional view on the line 2—2 in FIG. 1.
Figure 3:
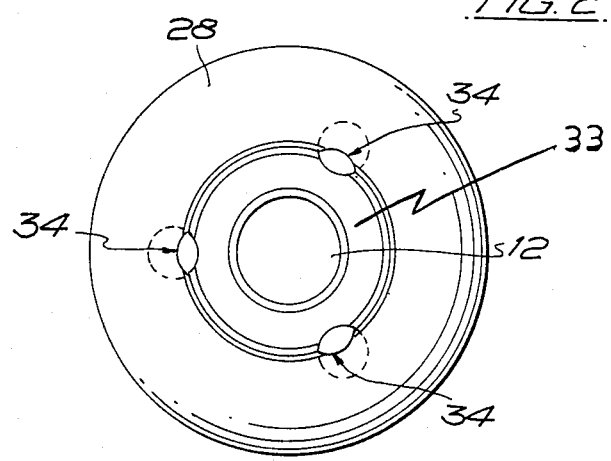
FIG. 3 is an end view in the direction of arrow 3 in FIG. 1.

Referring now to FIGS. 1 to 3 of the drawings, the drill chuck there illustrated includes a body part 10 having at one end an internally screw-threaded recess 12 by means of which it can be connected to a power tool driving spindle (not shown). At its other end the body part has an axially extending bore 14 for the reception of a drill shank (not shown) and has three equally spaced bores (not shown) which diverge from the axially extending bore for the reception of respective jaws, one of which, indicated 16, is shown in chain-dotted lines in FIG. 1. The jaws are slidably mounted in their respective bores and can be advanced so that they converge to grip a drill shank between parallel end portions; they can also be retracted into the body part to release the drill shank.

A circumferential groove 18 extends around the body part intermediate the ends of the latter and breaks into the bores (not shown) in which the jaws are slidably located. An integral nut and bevel gear element, generally indicated 20, which is formed in halves, engages the groove 18 so that the nut portion 22 thereof, which is formed with a tapering internal screwthread, has threaded engagement with thread elements of the jaws 16. The bevel gear portion 24 of the two part element 20, which surrounds and slidably bears upon a cylindrical portion of the body part, can be engaged by a bevel pinion portion of an extraneous chuck key (not shown) a pilot end of which can be received in any one of three equally spaced radial blind bores 26. By the use of such an extraneous chuck key the integral nut and bevel gear element can, in known manner, be rotated relative to the body part whereby the chuck jaws can be simultaneously advanced or retracted as required.

The integral nut and bevel gear element, which has been formed in halves so that it has been able to be assembled with the nut portion engaging the thread elements of the jaws, is axially located by its engagement in the groove 18 and is held together by a cylindrical sleeve 28 made as a pressing from relatively light gauge metal plate. The integral nut and bevel gear element is stepped, as shown, for the reception of the end of the cylindrical sleeve. The end of the sleeve remote from the integral nut and bevel gear element is completely inturned to form a flange 30 which extends concentrically within the generally cylindrical shape of the sleeve, said flange forming a bearing surface and enaging a cylindrical portion 32 of the body part.

Abutment means are provided at that end of the body part on which the flange portion of the generally cylindrical sleeve is rotatably engaged and act against said sleeve to hold it in its required position relative to the integral nut and bevel gear element. As shown, the abutment means are constituted by three equally spaced localised swellings 34 which have been formed at the surface 33 of a cylindrical portion 32 of the body part. The localised swellings 34 have been produced by the action of a tool, which will presently be described, causing plastic deformation of metal, for a relatively short distance longitudinally of the body part from the end surface, at three spaced points around the cylindrical portion. The action of the tool referred to has produced shallow grooves 36 in the surface of the cylindrical portion 12, the material displaced spilling radially outwards to form the localised swellings referred to.

Figure 4:
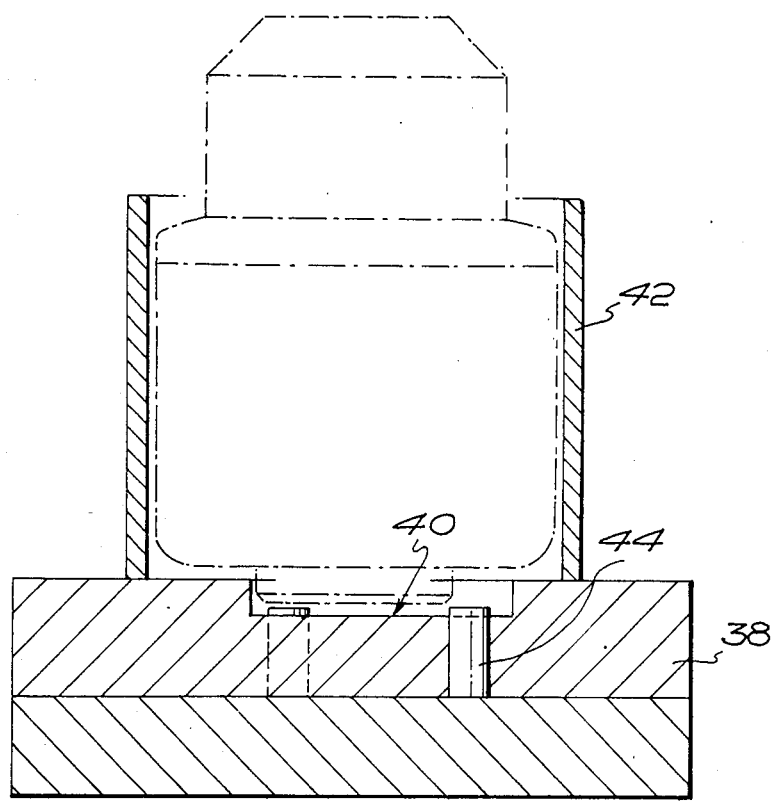
FIGS. 4 and 5 are respective sectional and plan views of a press tool for use in a final step in the manufacture of the chuck.
Figure 5:
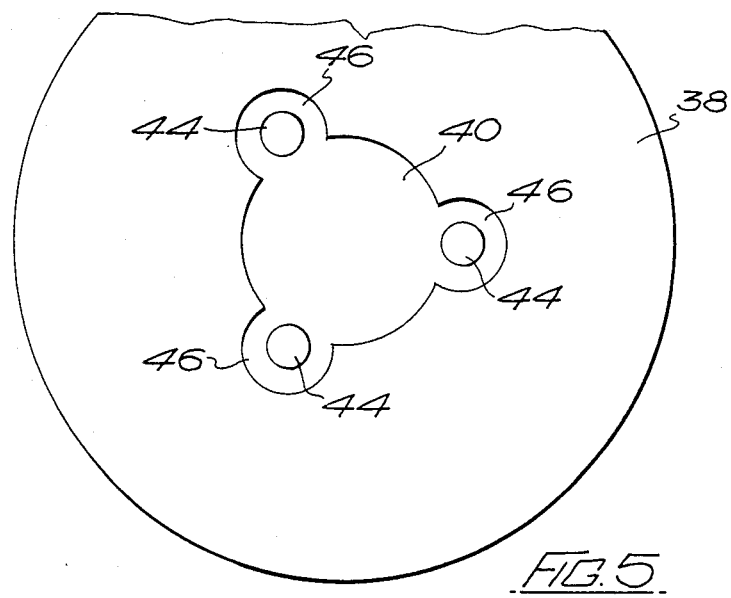

Referring now in particular to FIGS. 4 and 5, there is there illustrated a press tool by means of which the abutment means referred to at the rearward end of the body part of a chuck of the kind referred to can be formed. The press tool comprises a tool body part 38 in which a cylindrical flat bottomed depression 40 has been formed to receive the cylindrical portion 32 of the body part of the chuck as shown in FIG. 4. Means are provided for guiding the assembled chuck downwards into engagement with the cylindrical depression, these means in the illustrated example being shown to be constituted by an upstanding cylindrical sleeve 42 through which the chuck is a close sliding fit.

As shown, the press tool includes three equally spaced pins 44 upstanding from the bottom of the depression 40, these being on a pitch circle diameter such that the radially inner portions of said pins interfere with the cylindrical surface 32 of the chuck body as shown in FIG. 3. Each pin is seated within a counterbore portion 46 machined in the surface of the press tool to the depth of the depression 40. The pins abut against a top surface of a base plate 48 which is located beneath the tool body, part 38.

The arrangement is such that when a chuck has been fully assembled and it is desired to form the abutment means referred to at the rearward end of the body part of the chuck, in order to make captive the cylindrical or generally cylindrical sleeve, the chuck can be placed in upstanding condition on the press tool so that the cylindrical portion of the body part on which the abutment means are to be formed registers in the cylindrical depression 40 and rests upon the plurality of spaced pins 44. In a subsequent step, the chuck is pressed downwardly to force the cylindrical portion of the chuck into abutment with the flat bottom of the depression 40. During this operation, the three spaced pins 44 produce the respective plastic deformations of metal longitudinally of the cylindrical portion of the body part, these forming respective localised swellings at the surface of said cylindrical portion of the body part.

The simple press tool just described has been found to be ideal for producing very quickly and conveniently the localised swellings referred to at the surface of the cylindrical portion of the body part. When, after long use, the exposed edges of the pins 44 have become worn, it is a simple matter to remove them so that they can be re-ground or replaced by new pins.

It will be understood that the provision of the abutment means in the manner described can be effected at relatively low cost because it requires no prior machining of the body part.

Various modifications may be made to the chuck described above. For example, the shape of the grooves from which the deformed metal provides the respective swellings 34 need not be exactly as shown in the drawings. It will also be understood that any desired number of swellings forming the required abutment means may be provided; but if there are at least three such swellings there is a self-centring action as the tool produces the shallow three or more grooves simultaneously. The required depth of the grooves in order to obtain adequate swellings may be determined by trial and experiment. If they are relatively few in number, say three, the swellings will require to be larger than if they are, say, six in number for the same degree of resistance to sleeve displacement. The length of the grooves, which of course also affects the size of the resultant swellings, is governed by the distance by which the cylindrical portion 32 of the body part projects from the end face of the sleeve 28.

It is not essential for the nut member and bevel gear element to be formed integrally together. They could be formed separately, in which case the bevel gear element would be formed as an unbroken ring encircling the two halves of the nut member to hold them together. The body part need not necessarily be formed with a screwthreaded recess by means of which it can be connected to a power tool driving spindle. It could instead be provided with a screwthreaded spigot portion or even with a taper shank type of fitting if required.

What I claim and desire to secure by Letters Patent is:

1. A drill chuck including a body part (10) having an axially extending bore (14) for the reception of a drill shank; three equally spaced bores diverging from the axially extending bore for the reception of respective jaws (16); a nut member (22) rotatably mounted on the body part and located in a circumferential groove (18) in the body part (10) to have screwthreaded engagement with the jaws; a bevel gear element (24); a generally cylindrical sleeve (28) connected to the bevel gear element (24) and extending rearwardly of the body part (10) to rotatably engage a cylindrical portion (32) of the body part having a surface (33), and abutment means provided at that end of the body part on which the generally cylindrical sleeve (28) is rotatably engaged to hold the sleeve in position relative to the bevel gear element (24), characterized in that the abutment means include a plurality of localized swellings (34) formed at the surface (33) of the cylindrical portion (32) of the body part which is engaged by the generally cylindrical sleeve (28), the localized swellings (34) having been produced by plastic deformation of metal longitudinally of the body part (10).

2. A drill chuck according to claim 1, further characterized in that the localised swellings (34) are at least three in number and equally spaced around the cylindrical portion (32) of the body part (10) on which the sleeve (28) is rotatably engaged.

3. The method of manufacturing an assembled drill chuck cylindrical sleeve (28) retention arrangement for a drill chuck having a bevel gear nut (24), and body part (10) with a rear surface (33) comprising the steps of; forming abutment means at the rearward end surface (33) of the body part (10), by placing the assembled chuck in an upright position on a press tool so that the cylindrical portion (32) of the body part (10) on which the abutment means are to be formed registers in a cylindrical depression (40) in the press tool and rests upon a plurality of spaced pins (44) upstanding from the bottom of the depression, and pressing the assembled chuck inwardly of the depression to cause the plurality of spaced pins (44) to produce respective deformations of metal longitudinally of the cylindrical portion (32) of the body part, thereby forming respective localized swellings (34) at the surface of the cylindrical portion (32) of the body part (10).

4. The method according to claim 3, further characterized by the step of guiding the assembled chuck downwards into engagement with the cylindrical depression (40).

* * * * *